US009928560B2

(12) United States Patent
Reed et al.

(10) Patent No.: US 9,928,560 B2
(45) Date of Patent: Mar. 27, 2018

(54) SIGNAL DECODING METHODS, APPARATUS AND SYSTEMS

(71) Applicant: Digimarc Corporation, Beaverton, OR (US)

(72) Inventors: Alastair M. Reed, Lake Oswego, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/605,904

(22) Filed: May 25, 2017

(65) Prior Publication Data

US 2018/0005341 A1  Jan. 4, 2018

Related U.S. Application Data

(63) Continuation of application No. 15/131,961, filed on Apr. 18, 2016, now Pat. No. 9,655,919, which is a
(Continued)

(51) Int. Cl.
G06K 9/00 (2006.01)
G06T 1/00 (2006.01)
H04N 1/32 (2006.01)

(52) U.S. Cl.
CPC ........... *G06T 1/0028* (2013.01); *G06T 1/005* (2013.01); *H04N 1/32309* (2013.01); *G06T 2201/0051* (2013.01); *G06T 2201/0052* (2013.01)

(58) Field of Classification Search
CPC ............... G06T 1/0028; G06T 1/005; G06T 2201/0051; G06T 2201/0052; G06T 2201/0601; H04N 1/32309
See application file for complete search history.

(56) References Cited

U.S. PATENT DOCUMENTS

| 5,636,292 A | 6/1997 | Rhoads |
| 5,659,726 A | 8/1997 | Sandford, II et al. |

(Continued)

FOREIGN PATENT DOCUMENTS

| WO | WO9953428 | 10/1999 |
| WO | WO0007356 | 2/2000 |

OTHER PUBLICATIONS

US. Appl. No. 61/140,540, filed Dec. 23, 2008.
(Continued)

*Primary Examiner* — Shefali Goradia
(74) *Attorney, Agent, or Firm* — Digimarc Corporation

(57) ABSTRACT

The present invention relate generally to signal encoding and decoding. One claim recites a method comprising: obtaining color image data or color video data, the color image data or color video data comprising an encoded signal pattern, the encoded signal pattern aiding detection of an encoded message, the pattern comprising first frequency components and second frequency components, the color image data or color video data comprising first color data and second color data, in which the first color data comprises the first frequency components encoded therein, and the second color data comprises the second frequency components encoded therein; combining the first color data and the second color data, said combining yielding combined color data; utilizing one or more processors or electronic processing circuitry, detecting the encoded signal pattern from the combined color data, said detecting yielding rotation and scale information; and using the rotation and scale information to detect the encoded message from the combined color data. Of course, other combinations and claims are provided too.

27 Claims, 7 Drawing Sheets

Related U.S. Application Data continuation of application No. 14/572,478, filed on Dec. 16, 2014, now Pat. No. 9,317,888, which is a continuation of application No. 13/963,627, filed on Aug. 9, 2013, now Pat. No. 8,913,780, which is a continuation of application No. 12/636,561, filed on Dec. 11, 2009, now Pat. No. 8,509,474.

(60) Provisional application No. 61/140,540, filed on Dec. 23, 2008.

(56) References Cited

U.S. PATENT DOCUMENTS

| | | |
|---|---|---|
| 5,721,788 A | 2/1998 | Powell |
| 5,835,639 A | 11/1998 | Honsinger et al. |
| 5,848,155 A | 12/1998 | Cox et al. |
| 5,859,920 A | 1/1999 | Daly et al. |
| 5,862,260 A | 1/1999 | Rhoads |
| 5,930,369 A | 7/1999 | Cox |
| 5,949,055 A | 9/1999 | Fleet et al. |
| 6,018,593 A | 1/2000 | Yamagata |
| 6,031,914 A | 2/2000 | Tewfik et al. |
| 6,069,914 A | 5/2000 | Cox |
| 6,108,434 A | 8/2000 | Cox |
| 6,122,403 A | 9/2000 | Rhoads |
| 6,208,735 B1 | 3/2001 | Cox et al. |
| 6,233,347 B1 | 5/2001 | Chen et al. |
| 6,314,192 B1 | 11/2001 | Chen |
| 6,345,104 B1 | 2/2002 | Rhoads |
| 6,408,082 B1 | 6/2002 | Rhoads et al. |
| 6,411,392 B1 | 6/2002 | Bender et al. |
| 6,424,725 B1 | 7/2002 | Rhoads et al. |
| 6,449,377 B1 | 9/2002 | Rhoads |
| 6,563,935 B1 | 5/2003 | Echizen et al. |
| 6,590,996 B1 | 7/2003 | Reed et al. |
| 6,614,914 B1 | 9/2003 | Rhoads et al. |
| 6,697,498 B2 * | 2/2004 | Kawaguchi ............ G06T 1/0028 358/3.09 |
| 6,718,046 B2 | 4/2004 | Reed et al. |
| 6,763,123 B2 | 7/2004 | Reed et al. |
| 6,891,959 B2 | 5/2005 | Reed et al. |
| 6,912,295 B2 | 6/2005 | Reed et al. |
| 6,947,571 B1 | 9/2005 | Rhoads et al. |
| 7,039,214 B2 | 5/2006 | Miller et al. |
| 7,070,252 B2 | 7/2006 | de Queiroz et al. |
| 7,116,781 B2 | 10/2006 | Rhoads |
| 7,333,963 B2 * | 2/2008 | Widrow ............ G06F 17/30247 382/155 |
| 7,369,677 B2 | 5/2008 | Petrovic et al. |
| 7,697,716 B2 | 4/2010 | Miller et al. |
| 7,738,673 B2 | 6/2010 | Reed |
| 7,770,013 B2 * | 8/2010 | Rhoads ................ G06F 17/241 713/176 |
| 7,853,093 B2 | 12/2010 | Birinov et al. |
| 8,045,794 B2 | 10/2011 | Yamaguchi et al. |
| 8,127,137 B2 | 2/2012 | Levy |
| 8,175,323 B2 | 5/2012 | Yamaguchi et al. |
| 8,243,980 B2 | 8/2012 | Rhoads et al. |
| 8,279,494 B2 * | 10/2012 | Park ..................... G06F 3/1205 345/156 |
| 8,509,474 B1 | 8/2013 | Reed et al. |
| 8,655,068 B1 * | 2/2014 | Li ............................ H04N 1/60 382/128 |
| 8,913,780 B2 | 12/2014 | Reed et al. |
| 9,317,888 B2 | 4/2016 | Reed et al. |
| 9,401,001 B2 * | 7/2016 | Reed ..................... G06T 1/0028 |
| 9,665,919 B2 | 5/2017 | Reed et al. |
| 2001/0019611 A1 | 9/2001 | Hilton |
| 2002/0178362 A1 | 11/2002 | Kwon |
| 2007/0286454 A1 * | 12/2007 | Brundage ............... G06T 1/005 382/100 |
| 2008/0310673 A1 | 12/2008 | Petrovic et al. |
| 2009/0092280 A1 | 4/2009 | Yamaguchi et al. |
| 2009/0180152 A1 * | 7/2009 | Bala ..................... H04N 1/387 358/3.28 |
| 2010/0150434 A1 | 6/2010 | Reed |

OTHER PUBLICATIONS

O'Ruanaidh, "Rotation, Scale and Translation Invariant Digital Image Watermarking," Signal Processing, pp. 2-15, May 1, 1998.
O'Runanaidh, "Rotation, Scale and Translation Invariant Digital Image Watermarking," 1997 IEEE, pp. 536-539.
Sheng, "Experiments on Pattern Recognition Using Invariant Fourier-Mellin Descriptors," Journal of Optical Society of America, vol. 3, No. 6, pp. 771-776, 1986.

* cited by examiner

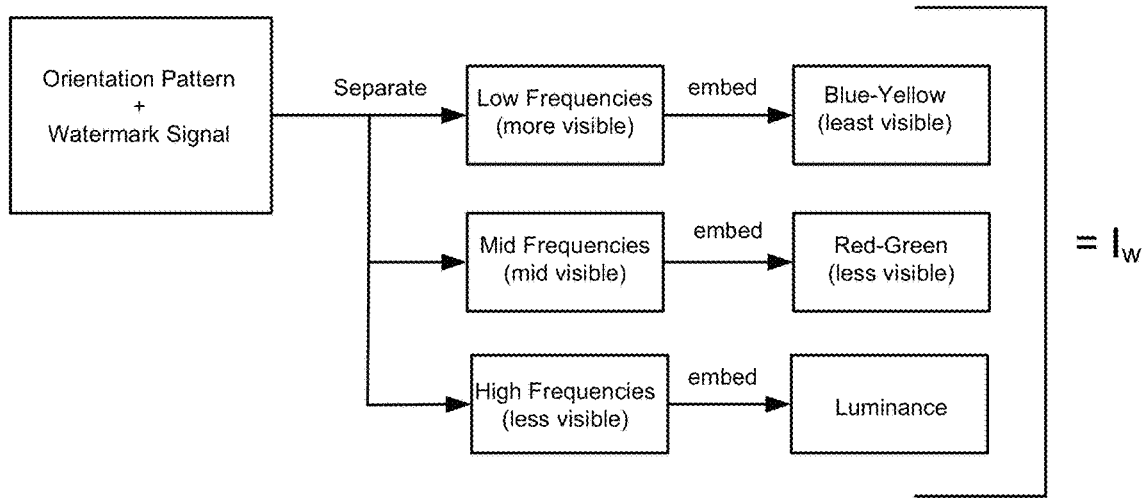
Fig. 5
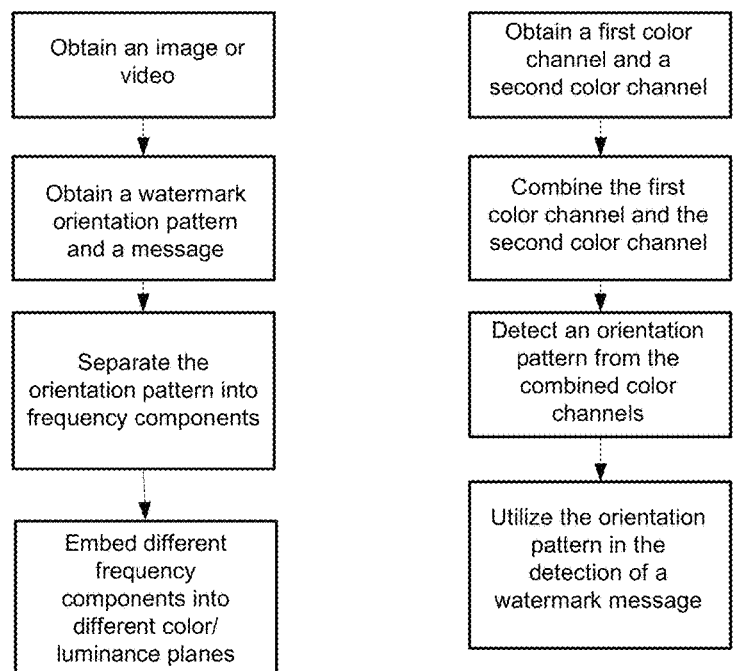
Fig. 6a
Fig. 6b

SIGNAL DECODING METHODS, APPARATUS AND SYSTEMS

RELATED APPLICATION DATA

This application is a continuation of U.S. application Ser. No. 15/131,961, filed Apr. 18, 2016 (now U.S. Pat. No. 9,665,919) which is a continuation of U.S. application Ser. No. 14/572,478, filed Dec. 16, 2014 (now U.S. Pat. No. 9,317,888) which is a continuation of U.S. patent application Ser. No. 13/963,627, filed Aug. 9, 2013 (now U.S. Pat. No. 8,913,780) which is a continuation of U.S. patent application Ser. No. 12/636,561, filed Dec. 11, 2009 (now U.S. Pat. No. 8,509,474) which claims the benefit of U.S. Provisional Patent Application No. 61/140,540, filed Dec. 23, 2008. The 61/140,540 application is hereby incorporated by reference herein in its entirety.

TECHNICAL FIELD

The present disclosure relates generally to steganographic data hiding and digital watermarking.

BACKGROUND AND SUMMARY

The term "steganography" generally means data hiding. One form of data hiding is digital watermarking (or simply "watermarking" as used in this document). Digital watermarking is a process for modifying media content to embed a machine-readable (or machine-detectable) signal or code into the media content. For the purposes of this document, the data may be modified such that the embedded code or signal is imperceptible or nearly imperceptible to a user, yet may be detected through an automated detection process. Unlike overt symbologies (e.g., barcodes), an unaided human eye or ear generally will not be able to discern the presence of the digital watermark in imagery (including video) or audio. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by transforming (or altering or modifying) data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process then combines the watermark signal with host media content and possibly other signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

The above mentioned orientation pattern is helpful in identifying the watermark signal during detection. It can also provide helpful orientation clues regarding rotation, scale and translation (e.g., distance from origin) of the watermark signal.

A watermark encoder may analyze and selectively transform media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation), etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these above patent documents is hereby incorporated by reference herein in its entirety. Of course, a great many other approaches are familiar to those skilled in the art. The artisan is presumed to be familiar with a full range of literature concerning steganography, data hiding and digital watermarking.

One combination described in this disclosure is a method including: obtaining a first color channel and a second color channel, the first color channel and the second color channel are components of a color image signal or color video signal; obtaining a digital watermark orientation pattern, the orientation pattern serving to facilitate detection of a watermark message; separating the digital watermark orientation pattern into first frequency components and second frequency components; utilizing a processor or electronic processing circuitry, transforming the first color channel by steganographically embedding the first frequency components therein; and utilizing a processor or electronic processing circuitry, transforming the second color channel by steganographically embedding the second frequency components therein.

Another combination described in this disclosure is a method including: obtaining a first color channel, a second color channel and a luminance channel, the first color channel, the second color channel and the luminance channel are each components of a color image signal or color video signal; obtaining a digital watermark orientation pattern, the orientation pattern serving to facilitate detection of a watermark message; separating the digital watermark orientation pattern into first frequency components, second frequency components and third frequency components; utilizing a processor or electronic processing circuitry, transforming the first color channel by steganographically embedding the first frequency components therein; utilizing a processor or electronic processing circuitry, transforming the second color channel by steganographically embedding the second frequency components therein; and utilizing a processor or electronic processing circuitry, transforming the luminance channel by steganographically embedding the third frequency components therein.

Still another combination described in this disclosure is an apparatus including: a processor; and instructions for execution by the processor. The instructions include instructions to: i) obtain a first color channel and a second color channel, the first color channel and the second color channel are components of a color image signal or color video signal; ii) obtain a digital watermark orientation pattern, the orientation pattern serving to facilitate detection of a watermark message; iii) separate the digital watermark orientation pattern into first frequency components and second frequency components; iv) transform the first color channel by steganographically embedding the first frequency components therein; and v) transform the second color channel by steganographically embedding the second frequency components therein.

Yet another combination described in this disclosure is an apparatus including: a processor; and instructions for execution by the processor. The instructions include instructions to: i) obtain a first color channel, a second color channel and a luminance channel, the first color channel, the second color channel and the luminance channel are each components of a color image signal or color video signal; ii) obtain a digital watermark orientation pattern, the orientation pattern serving to facilitate detection of a watermark message; iii) separate the digital watermark orientation pattern into first frequency components, second frequency components and third frequency components; iv) transform the first color channel by steganographically embedding the first frequency components therein; v) transform the second color channel by steganographically embedding the second frequency components therein; and iv) transform the luminance channel by steganographically embedding the third frequency components therein.

In some other combinations described in this disclosure, a watermark message signal (e.g., a payload carry component) may be inserted into one or more color channels along with isolated frequency components of an orientation signal for that channel.

Further combinations, aspects, features and advantages will become even more apparent with reference to the following detailed description and accompanying drawing.

BRIEF DESCRIPTION OF THE DRAWINGS

FIG. 5 is a diagram illustrating separation of a combined watermark orientation and message signal into different frequencies, and embedding of the different frequencies into different color and luminance channels.

FIG. 6a is a flow diagram of a watermark embedding process.

FIG. 6b is a flow diagram of a watermark detection process.

DETAILED DESCRIPTION

We continue to improve the invisibility and robustness of our digital watermarking. The following discussion details some recent improvements.

Figure 1:
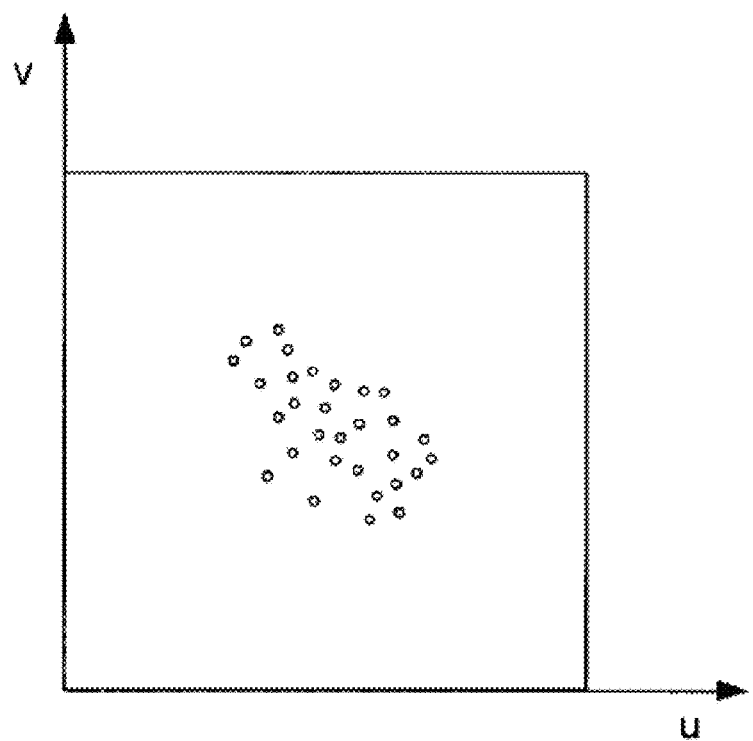
FIG. 1 illustrates impulse functions as points in a spatial frequency domain.
Figure 2:
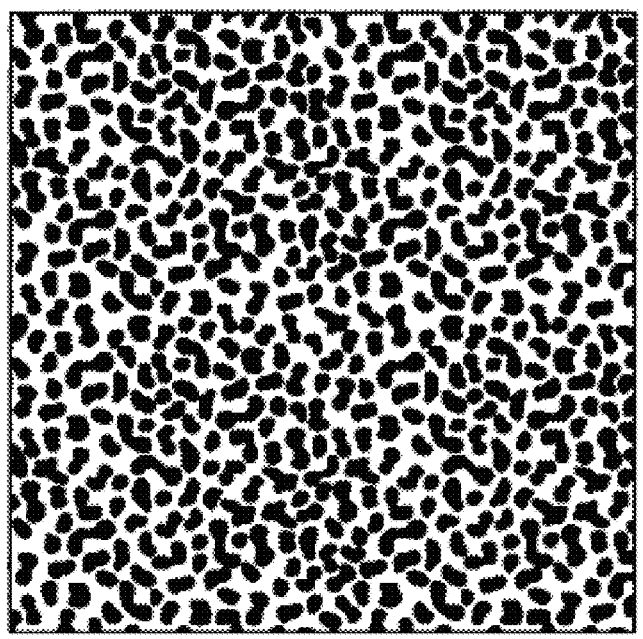
FIG. 2 illustrates an orientation pattern in a spatial domain.

The above mentioned orientation pattern (or orientation "component" or "signal") may include or be represented by, e.g., a pattern of symmetric impulse functions in the spatial frequency domain. In the spatial domain, these impulse functions may look like, e.g., cosine waves. One example of the orientation pattern is depicted in FIGS. 1 and 2. FIG. 1 shows the impulse functions as points in the spatial frequency domain, while FIG. 2 shows the orientation pattern in the spatial domain. Before adding an orientation pattern component to a message or image (or video), the embedder may transform the watermark components to a common domain. For example, if the message component is in a spatial domain and the orientation component is in a frequency domain, the embedder may transform the orientation component to a common spatial domain before combining them together. Or, the message may be transformed into a transform domain to be combined with an orientation component there.

One improvement separates digital watermark components into different color channels to reduce the collective visibility of the components. This is achieved, at least in part, to reduce perceptibility of the watermark components by adapting them to (or utilizing) the Human Visual System and to improve robustness by assigning more robust (and, therefore, more visible) components to color channels that are more likely to be affected by transmission (e.g., compression).

For example, the orientation pattern discussed above can be separated into different frequency components, e.g., high, mid and low frequency components. Separating an orientation pattern into different frequency components and decomposing host media content (e.g., image or video) into different channels is performed, e.g., to take advantage of the fact that the Human Visual System (sometimes referred to as "HVS") responses differently to information in these different frequencies and channels.

Figure 3:
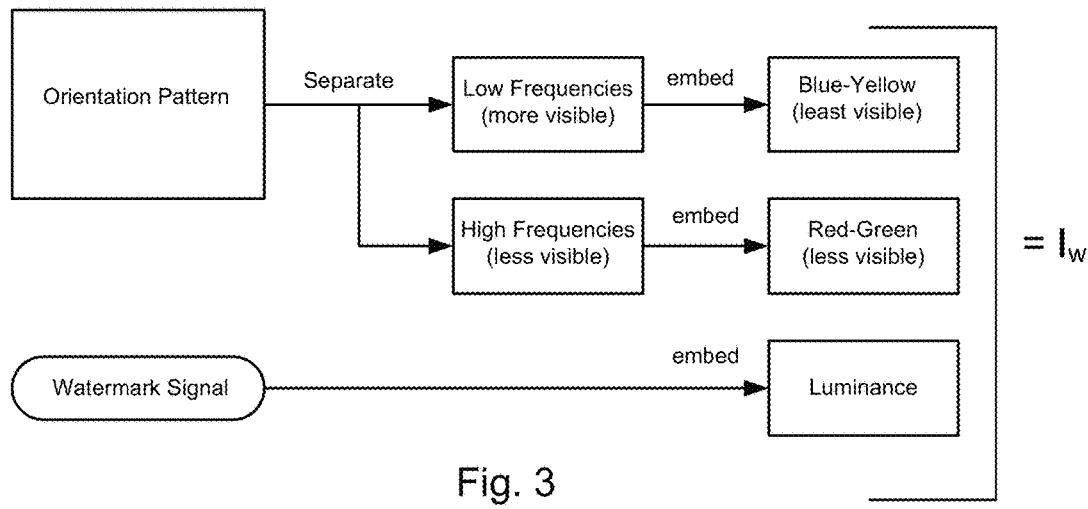
FIG. 3 is a diagram illustrating separation of a watermark orientation signal into different frequencies, and embedding of the different frequencies into different color channels.

One implementation is described with reference to FIG. 3. An orientation pattern is separated (e.g., split, divided, decomposed, and/or partitioned, etc.) into high and low frequency components, and these separated frequency components are isolated to or embedded in independent color channels. In the case of images and video, low frequency components are typically more visually perceptible to the HVS; whereas high frequency components are relatively less visually perceptible to the HVS. A simple division of the orientation pattern could be a half-way frequency (or other predetermined frequency) between DC and the highest possible frequency component. Alternatively, the division could be based on characteristics of the orientation pattern itself or on characteristics of the host media signal. Yet another option for separating the frequency components can be obtained through testing designs to identify those frequency components that are more visible than those that are less visible. Robustness considerations can also influence the choice of the frequency component decomposition, in addition to HVS considerations.

Images and video can be separated into (or represented by) different color channels (also called color "planes" or "directions"). For example, an image or video can be represented by a Blue-Yellow color channel, a Red-Green color channel and a luminance channel. Contrast Sensitivity Function (sometime referred herein as "CSF") curves for these three channels show that the human eye is most sensitive to changes in the luminance channel. Comparatively, it is less sensitive to changes in the color channels. Among the color channels, the human eye is less sensitive to the Blue-Yellow channel (or direction) relative to the orthogonal Red-Green channel (or direction). CSF considers a combination of both the human eye and how the brain interprets what the human eye sees.

In view of how the human eye perceives the above different color and luminance channels, we designate the low frequency components (more visible to the human eye) of the orientation pattern for embedding in the Blue-Yellow channel (where the human eye is relatively less sensitive). And the high frequency components (less visible to the human eye) of the orientation pattern are designated for embedding in the Red-Green channel (where the human eye is relatively more sensitive). This frequency component-to-color channel mapping provides improved imperceptibility for an embedded watermark.

A benefit of this frequency component-to-color channel mapping is improved robustness. Components of the media signal that are less visible are usually subject to more aggressive quantization (i.e., more compression) by compression techniques. Consequently, the Blue-Yellow channel is likely to be more highly compressed. On the other hand, lower frequency components of a signal are better suited to survive compression. Embedding the lower frequency components into the Blue-Yellow channels ensures that these frequency components survive compression better. This provides improved robustness during detection. As a result, designating the decomposed orientation signal components for embedding into the most appropriate media signal channels achieves the desired effect of both reducing visibility of the orientation signal and increasing its robustness.

Relative to an orientation pattern, the watermark signal may have lower visibility attributes. This is certainly the case, e.g., if the watermark signal is a spread spectrum pattern in the spatial domain. Relatively lower visibility attributes of the watermark signal may also be present if the watermark signal includes a frequency domain pattern (or a modulation of frequency domain components). In this case, the frequency decomposition (or separating) techniques discussed herein for the orientation signal would also be applicable to the watermark signal.

A watermark signal (e.g., including a message or payload) can be embedded in a luminance channel of the image or video, and may even be embedded with a gain or signal strength greater (e.g., 2x-6x more) than the embedding gain or signal strength used to embed the components of the orientation component without significantly impacting the imperceptibility of the overall watermarking.

The Blue-Yellow channel (including low frequency components of the orientation pattern embedded therein), the Red-Green channel (including high frequency components of the orientation pattern embedded therein) and the luminance channel (including the watermark signal embedded therein) are combined to provide a watermarked image (or video) $I_w$.

Figure 4:
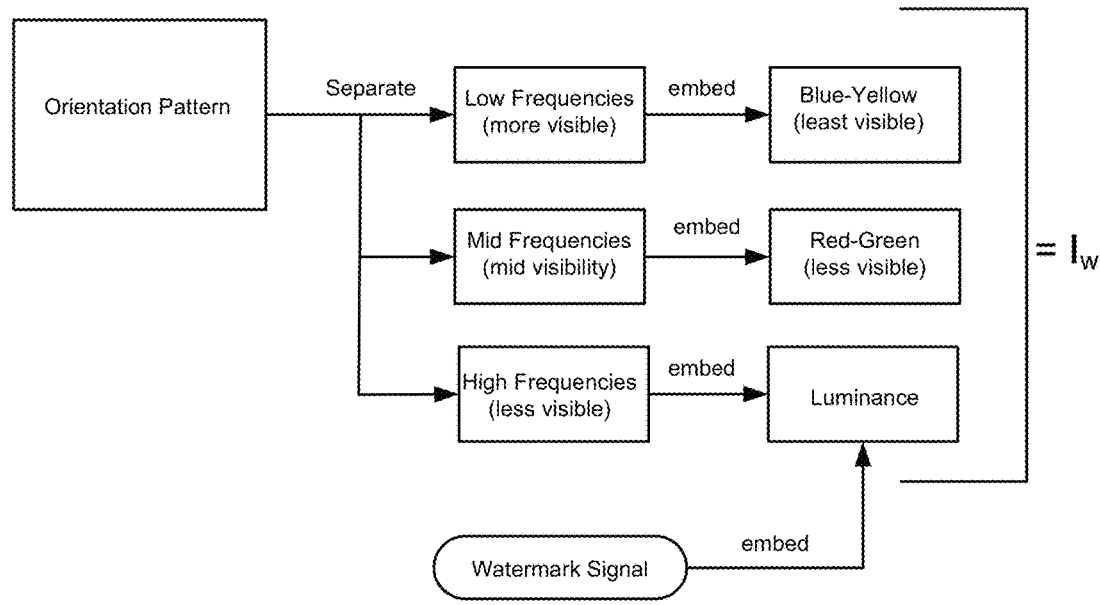
FIG. 4 is a diagram illustrating separation of a watermark orientation signal into different frequencies, and embedding of the different frequencies into different color and luminance channels.

FIG. 4 illustrates a related embedding method. A watermark orientation pattern is separated (e.g., split, divided, decomposed, and/or partitioned, etc.) into high, mid and low frequency components. In the case of images and video, low frequency components are typically more visually perceptible to the human eye; whereas mid and high frequency components are relatively less visually perceptible to the human eye. This division between frequencies can be selected either by dividing the available frequency domain into, e.g., thirds (or other predetermined values), or by dividing the available frequency domain according to characteristics of the signals themselves, or through testing for desired visibility.

The low frequency components (more visible to the human visual system) of the orientation pattern are embedded in the Blue-Yellow channel (where the human visual system is the least sensitive). The mid frequency components (relatively less visibility to the human visual system) of the orientation pattern are embedding in the Red-Green channel (where the human eye is relatively more sensitive). And the high frequency components (even less visibility to the human visual system) are embedded in luminance channel (where the human visual system is the most sensitive). This frequency component-to-color channel mapping provides both improved imperceptibility and improved robustness for an embedded watermark.

A watermark signal (e.g., including a message or payload) is also embedded in the luminance channel of the image or video. Depending on the nature and characteristics of the watermark signal, it could also be decomposed into separate frequency components and embedded in different channels of the media signal. The frequency component decomposition of the watermark signal could be different than that of the orientation signal (e.g., the orientation signal may be decomposed into three components, whereas the watermark signal could be decomposed into two components). In this case, the components are appropriately designated for embedding into corresponding media content channels based on characteristics of the human visual system and robustness considerations. And such a frequency/message component-to-color/luminance channel mapping provides improved imperceptibility for an embedded watermark.

FIG. 5 illustrates yet another related embedding method. A watermark signal and a watermark orientation pattern are combined to yield a composite watermark signal. The composite watermark signal is then separated (or split, divided, partitioned, etc.) into high, mid and low frequency components. In the case of images and video, low frequency components are typically more visually perceptible to the human eye; whereas mid and high frequency components are relatively less visually perceptible to the human eye.

The low frequency components (more visible to the human visual system) of the orientation pattern are embedded in the Blue-Yellow channel (where the human eye is relatively less sensitive). The mid frequency components (which are relatively less visible to the human visual system) of the orientation pattern are embedded in the Red-Green channel (where the human visual system is relatively more sensitive). And the high frequency components (even less visible to the human visual system) are embedded in luminance channel. This frequency component-to-color channel mapping provides improved imperceptibility for an embedded watermark.

FIG. 6a is a flow diagram of one example embedding method (or operation of a watermark embedder). An image or video and a watermark signal (e.g., including an orientation pattern and message, separate or combined) are obtained. The orientation pattern is separated into frequency components (e.g., high, mid and low frequencies). Separate frequency components are embedded into different color channels. For example, high frequency components can be embedded in a Red-Green channel, and low frequency components can be embedded in a Blue-Yellow channel.

A watermark detector (or an image or video processor cooperating with the watermark detector) reassembles the various color/luminance components prior to watermark detection. For example, the color channels can be combined or added together prior to watermark detection. If frequency components are embedded in a luminance channel, the following equation can be used to reassemble the various components (e.g., for 8 bit image data in this example):

Luminance=0.29*R+0.58*G+0.13*B redGreen=0.6*R−0.3*G+128 blueYellow=−0.1*R−0.1*G+0.8*B+128

For performance reasons, the above three (3) channels above can be summed as shown below to create a single 8 bit grayscale image for passing to a luminance-based watermark detector.

combinedLab=0.88*R+0.27*G+0.93*B−256

FIG. 6b is a flow diagram of one example of a detection method (or operation of a watermark detector). A watermarked image or video is obtained, e.g., and first and second color channels are obtained and combined. The image or video has been previously embedded according to at least one of the above embedding processes, e.g., with separate watermark frequencies embedded in different color channels. A watermark orientation pattern is detected from data representing the combined color channels. For example, the data may be a transform domain representation of the combined color channels. Once detected, the orientation pattern is utilized to detect a watermark message, if present. For example, scale and rotation clues can be determined from the orientation pattern and used to find the message, or to realign the combined color channels prior to message detection and decoding.

Returning to the discussion of watermark orientation components, we model or represent one example of an orientation component with the following figures and equations. Of course, this discussion is not intended to be limiting, as other orientation component models or representations are available. Rather, the following discussion is provided to demonstrate some of our inventive methods, apparatus and systems including separating watermark components into different channels to reduce their collective perceptibility.

Figure 7:
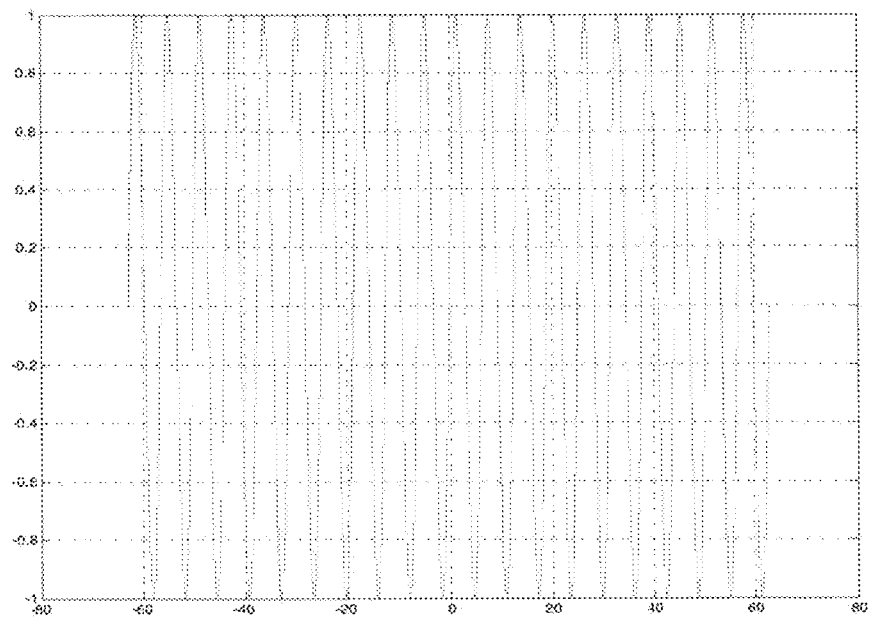
FIG. 7 is a graph showing a first high frequency signal.
Figure 8:
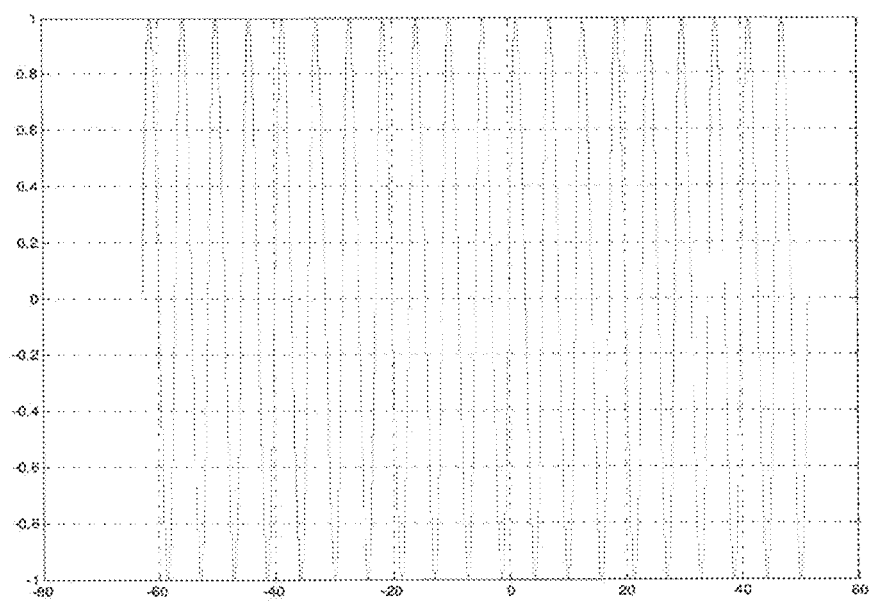
FIG. 8 is a graph showing a second high frequency signal.

With Reference to FIGS. 7 and 8, two (2) high frequency signals are illustrated, respectively $I_1(x)$ and $I_2(x)$, which varies with a sinus law:

$I_1(x)=I_0 \cdot \sin(2\pi \cdot k_1 \cdot x)$ $I_2(x)=I_0 \cdot \sin(2\pi \cdot k_2 \cdot x)$ Io is the sine wave magnitude; $k_1$ and $k_2$ are the respective frequencies of the signals. The signal steps are respectively $p_1=1/k_1$ and $p_2=1/k_2$.

Figure 9:
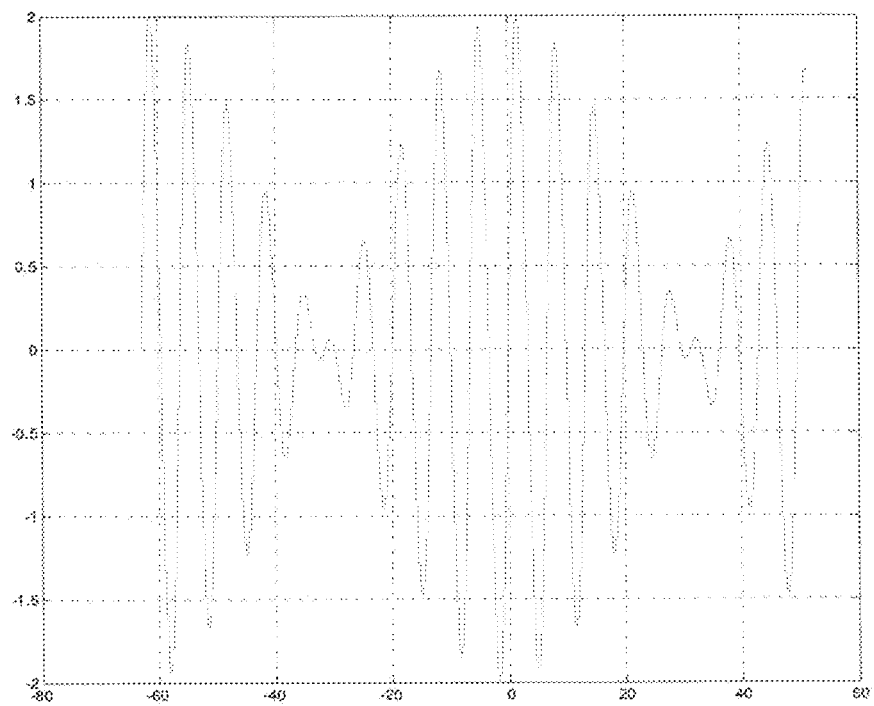
FIG. 9 is a graph showing low frequency interference from the sum of the signals shown in FIG. 7 and FIG. 8.

When $I_1(x)$ and $I_2(x)$ are superimposed, the resulting intensity (e.g., producing an interference) is shown in FIG. 9 and represented by:

$I(x)=I_0 \cdot (\sin(2\pi \cdot k_1 \cdot x)+\sin(2\pi \cdot k_2 \cdot x))$;

with the Euler's formula:

$$I(x) = I_0 \cdot 2\cos\left(2\pi \frac{(k_1 - k_2)}{2} \cdot x\right) \cdot \sin\left(2\pi \frac{(k_1 + k_2)}{2} \cdot x\right)$$

With reference to FIG. 9, the resulting intensity is made of a sinus law with a high spatial frequency (e.g., wave number) which includes an average of the spatial frequencies of the two patterns, and of a sinus law with a low spatial frequency which is the half of the difference between the spatial frequencies of the two patterns. This second component is an "envelope" for the first sinus law. The wavelength λ of this component is the inverse of the spatial frequency $$\frac{1}{\lambda} = \frac{k_1 - k_2}{2} = \frac{1}{2} \cdot \left(\frac{1}{p_1} - \frac{1}{p_2}\right)$$

if we consider that's $p_1=p$ and $p_2=p+\delta p$:

$$\lambda = 2\frac{p_1 p_2}{p_2 - p_1} \approx 2\frac{p^2}{\delta p}.$$

The distance between the zeros of this envelope is λ/2, and the maxima of amplitude are also spaced by λ/2; we thus obtain the same results as the geometrical approach, with a discrepancy of p/2 which is the uncertainty linked to the reference that is considered: $I_1(x)$ or $I_2(x)$. This discrepancy is negligible when $\delta p \ll p$.

Returning to FIG. 9, there is a recurring low frequency "beat" pattern that may cause objectionable visibility or perceptibility, e.g., when embedded in a media content. The visibility of the beat patterns can be minimized by spreading the constituent frequencies apart, resulting in a higher frequency beat pattern. (Recall from the discussion above, that high frequency patterns are less visible or perceptible, whereas low frequency patterns are more perceptible.)

Figure 10:
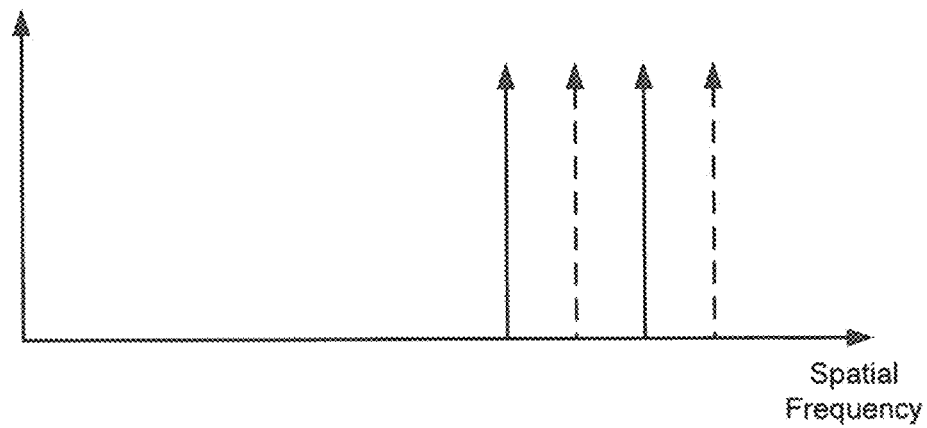
FIG. 10 is a frequency plot showing a separation of frequencies.

One way to spread constituent frequencies may include separating orientation component frequencies between the blue/yellow channel and red/green channels. With reference to FIG. 10, four (4) spatial frequencies are shown (in 1-dimension). Adjacent frequencies are embedded in separate color channels. For example, the "dashed" line represented frequencies are embedded in a red/green channel, while the solid line represented frequencies are embedded in the blue/yellow channel.

Another way to spread the frequencies is to place some frequencies in the luminance direction, and other frequencies in different color directions.

The complete orientation pattern is reconstructed at detection by adding or otherwise combining the two color channels before passing to the watermark detector.

Figure 11:
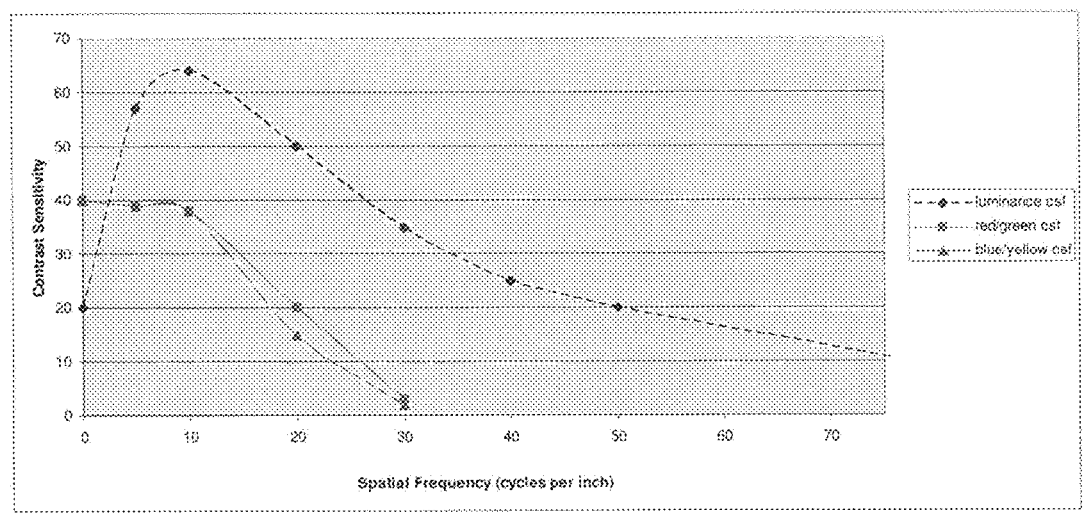
FIG. 11 illustrates a Human Visual System (HVS) response for a printed image.

To help even better understand characteristics of the HVS, FIG. 11 illustrates a HVS response for a printed image held at a distance of approximately 12" from the eye. Contrast Sensitivity is the HVS response to change in contrast of luminance, Red-Green and/or Blue-Yellow.

Now let's apply this to digital watermarking to see how the HVS and the above described methods, systems and apparatus interact. By way of example, please consider a digital watermark that includes the following characteristics:

1. A message signal including a signal that may be approximated with white noise up to about 75 cycles per inch; and 2. An orientation component including spikes in magnitude in a frequency space, e.g., in the 10-70 cycle/inch range (e.g., mid-frequency band).

Figure 12:
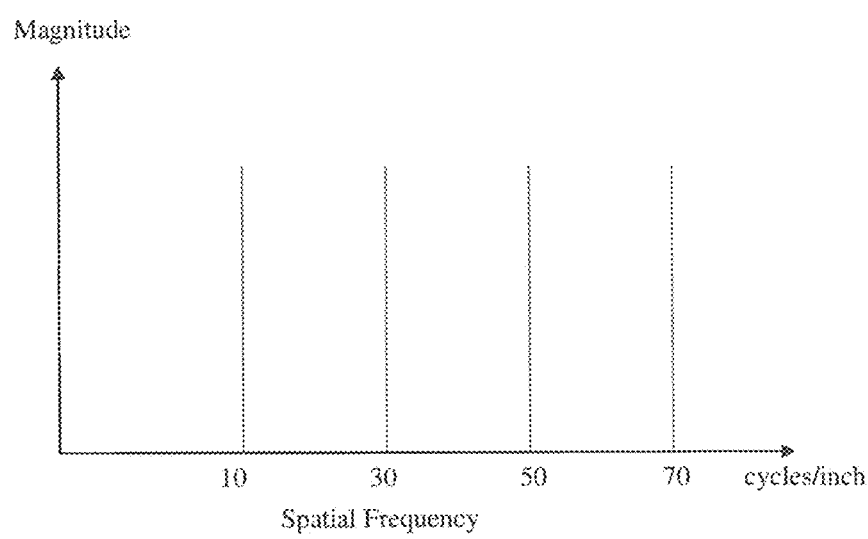
FIG. 12 illustrates spatial frequency components separated between two color channels.

In one dimension, a spike (or magnitude) at say 20 cycles/inch, corresponds to a cosine wave of this spatial frequency (see FIG. 12). No consider two spikes (or magnitudes) at say, e.g., 30 and 50 cycles per inch on the Red-Green or Blue-Yellow CSF. The eye is relatively insensitive to both these spatial frequencies individually. Sensitivity of about 2 or less compared to the peak sensitivity of about 40. The low frequency beat produced between these two spikes (or magnitudes) is:

beatFreq=(50−30)/2=10 cycles/inch.

By looking at FIG. 11, it can be seen that the beat frequency results in a sensitivity of about 40.

By interleaving the spikes (magnitudes) between Red-Green and Blue-Yellow the beat frequency in any one color channel can be doubled. Now consider two spikes (or magnitudes), at say 10 and 50 cycles/inch for Blue-Yellow (see FIG. 12). The low frequency beat produced between these two spikes is:

beatFreq=(50−10)/2=20 cycles/inch.

With reference to FIG. 11, it can be seen that the beat frequency results in a sensitivity of about 15 (compared to 40 for the lower spacing).

Figure 13:
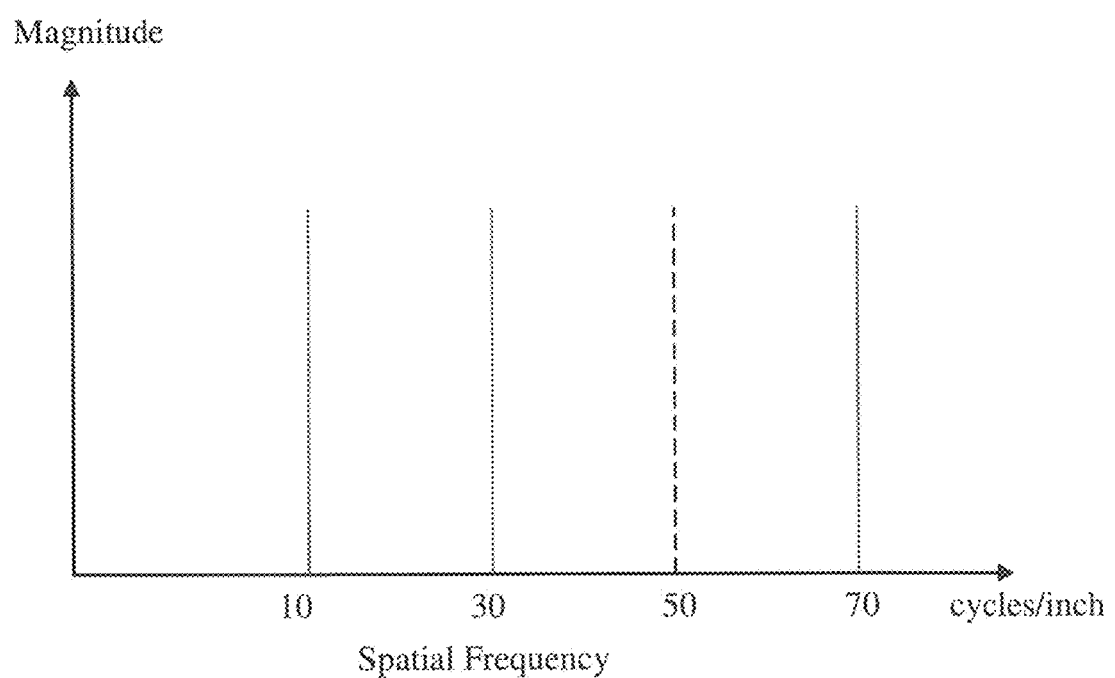
FIG. 13 illustrates spatial frequency components separated between three color/luminance channels.

This could be reduced even further, be interleaving between three (3) channels, luminance, Red-Green and Blue-Yellow as shown in FIG. 13.

Now consider two (2) spikes (or magnitudes), at say 10 and 70 cycles/inch for Blue-Yellow (see FIG. 12). The low frequency beat produced between these two spikes (or magnitudes) is:

beatFreq=(70−10)/2=30 cycles/inch.

By looking at FIG. 11, it can be seen that the beat frequency now results in a sensitivity of about 2 (compared to 40 for the lower spacing). The single frequency spikes at 30 for red/green and 50 for luminance, should also be relatively imperceptible as can be seen by looking up their sensitivities in FIG. 11 (sensitivity of 2 for Red-Green at 30, 20 for luminance at 50).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents herein in its entirety. Assignee's U.S. patent application Ser. No. 12/337,029, filed Dec. 17, 2008, is also hereby incorporated by reference herein in its entirety.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, and/or by executing software or instructions with a processor or circuitry. Similarly, watermark data decoding or decoders may be implemented in software, firmware, hardware, combinations of software, firmware and hardware, a programmable computer, electronic processing circuitry, and/or by executing software or instructions with a processor or parallel processors.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by a processor (or electronic processing circuitry, hardware, digital circuit, etc.).

While the above disclosure focuses primarily on image and video signals our inventive techniques can be similarly applied to audio signals. For example, an audio watermark orientation signal is separated into different frequency components and then inserted into left and right audio channels. In the case of high fidelity audio (e.g., 3 or more channels), the audio watermark orientation pattern is separated into three or more components and embedded in different audio channels.

The particular combinations of elements and features in the above-detailed embodiments are exemplary only; the interchanging and substitution of these teachings with other teachings in this and the incorporated-by-reference patents are also contemplated.

What is claimed is:

1. A method comprising:
obtaining color image data or color video data, the color image data or color video data comprising an encoded signal pattern, the encoded signal pattern aiding detection of an encoded message, the encoded signal pattern comprising first frequency components and second frequency components, the color image data or color video data comprising first color data and second color data, in which the first color data comprises the first frequency components encoded therein, and the second color data comprises the second frequency components encoded therein;
combining the first color data and the second color data, said combining yielding combined color data;
utilizing one or more processors or electronic processing circuitry, detecting the encoded signal pattern from the combined color data, said detecting yielding rotation and scale information; and
using the rotation and scale information to detect the encoded message from the combined color data.

2. The method of claim 1 in which the combined color data comprises luminance information, and in which encoded message is detected from the luminance information.

3. The method of claim 1 in which the first frequency components comprise higher frequency components relative to the second frequency components.

4. The method of claim 3 in which the first color data comprises red-green color data, and the second color data comprises blue-yellow color data.

5. The method of claim 4 in which the combined color data comprises luminance information, and in which encoded message is detected from the luminance information.

6. A non-transitory computer readable medium comprising instructions stored thereon that when executed by one or more processors perform or control the method of claim 5.

7. A non-transitory computer readable medium comprising instructions stored thereon that when executed by one or more processors perform or control the method of claim 1.

8. A method comprising:
obtaining color image data or color video data, the color image data or color video data comprising an encoded signal orientation pattern, the encoded signal orientation pattern facilitating detection of an encoded message, the encoded signal orientation pattern comprising first frequency components, second frequency components and third frequency components, the color image data or color video data comprising first color data, second color data and third color data, in which the first color data comprises the first frequency components encoded therein, the second color data comprises the second frequency components encoded therein and the third color data comprises the third frequency components encoded therein;
utilizing one or more processors or electronic processing circuitry, detecting the encoded signal orientation pattern from the first color data, the second color data and the third color data, said detecting yielding rotation and scale information; and
using the rotation and scale information to detect the encoded message from data representing the color image data or color video data.

9. The method of claim 8 in which the third frequency components comprise higher frequency components relative to the second frequency components and to the first frequency components, and the second frequency components comprise higher frequency components relative to the first frequency components.

10. The method of claim 9 in which the second color channel comprises a red-green color channel, and the first color channel comprises a blue-yellow color channel.

11. The method of claim 8 in which the data representing the color image data or color video data comprises luminance information, and the encoded message is detected from the luminance information.

12. A non-transitory computer readable medium comprising instructions stored thereon to cause an electronic processor to perform the method of claim 10.

13. The method of claim 9 in which the first frequency components are better suited to survive compression relative to the second frequency components and the third frequency components.

14. The method of claim 8 further comprising, prior to said act of detecting, combining the first color data, the second color data and the third color data, said combining yielding combined color data, in which said act of detecting detects the encoded signal orientation pattern from the combined color data.

15. A non-transitory computer readable medium comprising instructions stored thereon to cause an electronic processor to perform the method of claim 14.

16. A non-transitory computer readable medium comprising instruction stored thereon to cause an electronic processor to perform the method of claim 8.

17. An apparatus comprising:
memory storing color image data or color video data, the color image data or color video data comprising an encoded signal pattern, the encoded signal pattern aiding detection of an encoded message, the encoded signal pattern comprising first frequency components and second frequency components, the color image data or color video data comprising first color data and second color data, in which the first color data comprises the first frequency components encoded therein, and the second color data comprises the second frequency components encoded therein;
one or more processors or electronic processing circuitry configured for:
combining the first color data and the second color data, said combining yielding combined color data;
obtaining rotation and scale information from the encoded signal pattern in the combined color data;
decoding the encoded message from the combined color data, in which said decoding utilized the rotation and scale information.

18. The apparatus of claim 17 in which the combined color data comprises luminance information, and in which encoded message is decoded from the luminance information.

19. The apparatus of claim 17 in which the first frequency components comprise higher frequency components relative to the second frequency components.

20. The apparatus of claim 19 in which the first color data comprises red-green color data, and the second color data comprises blue-yellow color data.

21. The apparatus of claim 20 in which the combined color data comprises luminance information, and in which encoded message is decoded from the luminance information.

22. An apparatus comprising:
memory storing color image data or color video data, the color image data or color video data comprising an encoded signal orientation pattern, the encoded signal orientation pattern facilitating detection of an encoded message, the encoded signal orientation pattern comprising first frequency components, second frequency components and third frequency components, the color image data or color video data comprising first color data, second color data and third color data, in which the first color data comprises the first frequency components encoded therein, the second color data comprises the second frequency components encoded therein and the third color data comprises the third frequency components encoded therein; and
one or more processors or electronic processing circuitry configured for:
determining rotation and scale information associated with the encoded signal orientation pattern from the first color data, the second color data and the third color data; and
decoding the encoded message from data representing the color image data or color video data, in which said decoding utilizes the rotation and scale information.

23. The apparatus of claim 22 in which the third frequency components comprise higher frequency components relative to the second frequency components and to the first frequency components, and the second frequency components comprise higher frequency components relative to the first frequency components.

24. The apparatus of claim 23 in which the second color channel comprises a red-green color channel, and the first color channel comprises a blue-yellow color channel.

25. The apparatus of claim 22 in which the data representing the color image data or color video data comprises luminance information, and the encoded message is decoded from the luminance information.

26. The apparatus of claim 22 in which the first frequency components are better suited to survive compression relative to the second frequency components and the third frequency components.

27. The apparatus of claim 22 in which said one or more processors or electronic circuitry are confirmation for, prior to said decoding, combining the first color data, the second color data and the third color data, said combining yielding combined color data, in which said decoding decodes the encoded signal orientation pattern from the combined color data.

\* \* \* \* \*